(12) United States Patent
Takahashi

(10) Patent No.: US 9,948,390 B2
(45) Date of Patent: *Apr. 17, 2018

(54) IDENTIFYING A LOCATION IN A NETWORK WHERE NOISE IS GENERATED

(71) Applicant: International Business Machines Corporation, Armonk, NY (US)

(72) Inventor: Toshihiro Takahashi, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/190,440

(22) Filed: Jun. 23, 2016

(65) Prior Publication Data

US 2016/0301468 A1 Oct. 13, 2016

Related U.S. Application Data

(63) Continuation of application No. 14/551,244, filed on Nov. 24, 2014, now Pat. No. 9,401,762.

(30) Foreign Application Priority Data

Dec. 3, 2013 (JP) ................................ 2013-250005

(51) Int. Cl.
*H04B 3/00* (2006.01)
*H04L 25/00* (2006.01)
(Continued)

(52) U.S. Cl.
CPC ..... *H04B 10/0797* (2013.01); *H04B 10/0793* (2013.01); *H04B 10/2504* (2013.01); *H04B 10/272* (2013.01)

(58) Field of Classification Search
CPC ............ H04B 10/0797; H04B 10/0793; H04B 10/272; H04B 10/2504; H04B 10/0791; H04N 7/173
(Continued)

(56) References Cited

U.S. PATENT DOCUMENTS 8,854,947 B2* 10/2014 Jackson ............... H04L 12/4625
370/216
9,401,762 B2* 7/2016 Takahashi .......... H04B 10/0797
(Continued)

FOREIGN PATENT DOCUMENTS

JP H1093605 A 4/1998
JP 2004040737 A 2/2004
(Continued)

OTHER PUBLICATIONS

Takahashi, et al., "Identifying Device, Identifying Method and Program," JP Application No. 2013-250005, filed on Dec. 3, 2013
(Continued)

*Primary Examiner* — Phuong Phu
(74) *Attorney, Agent, or Firm* — Laura E. Gisler

(57) ABSTRACT

Configurations and processes for detecting a location at which noise is being generated in a network are disclosed. A device for identifying a location in a network at which noise is being generated may include: an acquiring unit for acquiring amplitude fluctuations in signals transmitted from a first device via a second device in the network; and a detecting unit for detecting a noise-generating device that is transmitting signals containing noise on the basis of the amplitude fluctuations acquired by the acquiring unit.

6 Claims, 11 Drawing Sheets

(51) Int. Cl.
    *H04B 10/079*     (2013.01)
    *H04B 10/272*     (2013.01)
    *H04B 10/25*      (2013.01)

(58) Field of Classification Search
    USPC ........ 375/257, 219, 220, 222, 224, 227, 228
    See application file for complete search history.

(56) References Cited

U.S. PATENT DOCUMENTS

| | | | |
|---|---|---|---|
| 2009/0007210 A1* | 1/2009 | Nishide | H04H 20/12 |
| | | | 725/125 |
| 2010/0030556 A1 | 2/2010 | Tanaka et al. | |
| 2010/0074384 A1 | 3/2010 | Hirayama et al. | |
| 2015/0222354 A1 | 8/2015 | Shang et al. | |

FOREIGN PATENT DOCUMENTS

| | | | |
|---|---|---|---|
| JP | 2004072477 A | 3/2004 |
| JP | 2009010815 A | 1/2009 |
| JP | 4943955 B2 | 5/2012 |

OTHER PUBLICATIONS

Takahashi, "Identifying a location in a Network Where Noise is Generated," U.S. Appl. No. 14/551,244, filed Nov. 24, 2014.
Takahashi, "Identifying a location in a Network Where Noise is Generated," U.S. Appl. No. 15/190,460, filed Jun. 23, 2016.
List of IBM Patents or Patent Applications Treated as Related, dated Jun. 22, 2016, 2 pages.

\* cited by examiner

IDENTIFYING A LOCATION IN A NETWORK WHERE NOISE IS GENERATED

CROSS REFERENCE TO RELATED APPLICATION

This application claims priority to Japanese Patent Application No. 2013-250005, filed Dec. 3, 2013, which is incorporated herein in its entirety.

BACKGROUND

Embodiments of the present invention relate to a device, method, and a program for identifying a location in a network where noise is generated.

When signals are transmitted upstream in a tree-like network such as a cable television broadcast (CATV) and a device is generating noise, the devices upstream from the noise-generating device and other lower-level devices connected to the upper-level device experience communication interference.

Patent Literature 1 Laid-Open Patent Publication No. 2004-72477

Patent Literature 2 Laid-Open Patent Publication No. 2004-40737

Patent Literature 3 Laid-Open Patent Publication No. 2009-10815

Techniques have been disclosed for identifying locations at which noise is being generated (see, for example, Patent Documents 1-3). In one example of a technique used to identify noise-generating devices, switches are provided through which signals are allowed to pass upstream to amplifiers in a network or at which the signals are blocked. When noise is generated, each of the switches is switched to either the passing state or the blocking state, and the noise-generating device is identified by detecting whether or not any noise is present. Therefore, in this technique, switches have to be provided at each branch in the network. Also, the switches must be switched an average of DN/2 times in a network where D is the number of levels and N is the number of branches in communication paths. As a result, the configurations and processes used to detect the locations at which noise is being generated in a network can become complicated using these techniques.

SUMMARY

In various embodiments of the present invention, a device for identifying a location of noise in a network includes an acquiring unit and a detecting unit. The acquiring unit is connected to the network. The network may be a tree-like structure having an upper-level device at a highest level of the network, one or more second devices at one or more middle levels of the network, and a plurality of first devices at a lowest level of the network. The acquiring unit acquires amplitude fluctuations in signals transmitted from the first devices via at least one second device to the upper-level device. The detecting unit detects a noise-generating device that is transmitting signals containing noise on the basis of the amplitude fluctuations in signals acquired by the acquiring unit. Various other embodiments are directed to a method and a program for identifying a location of noise in a network.

This summary of the present invention is not intended to enumerate all of the required characteristics of the present invention. The present invention may be realized by any combination or sub-combination of these characteristics.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
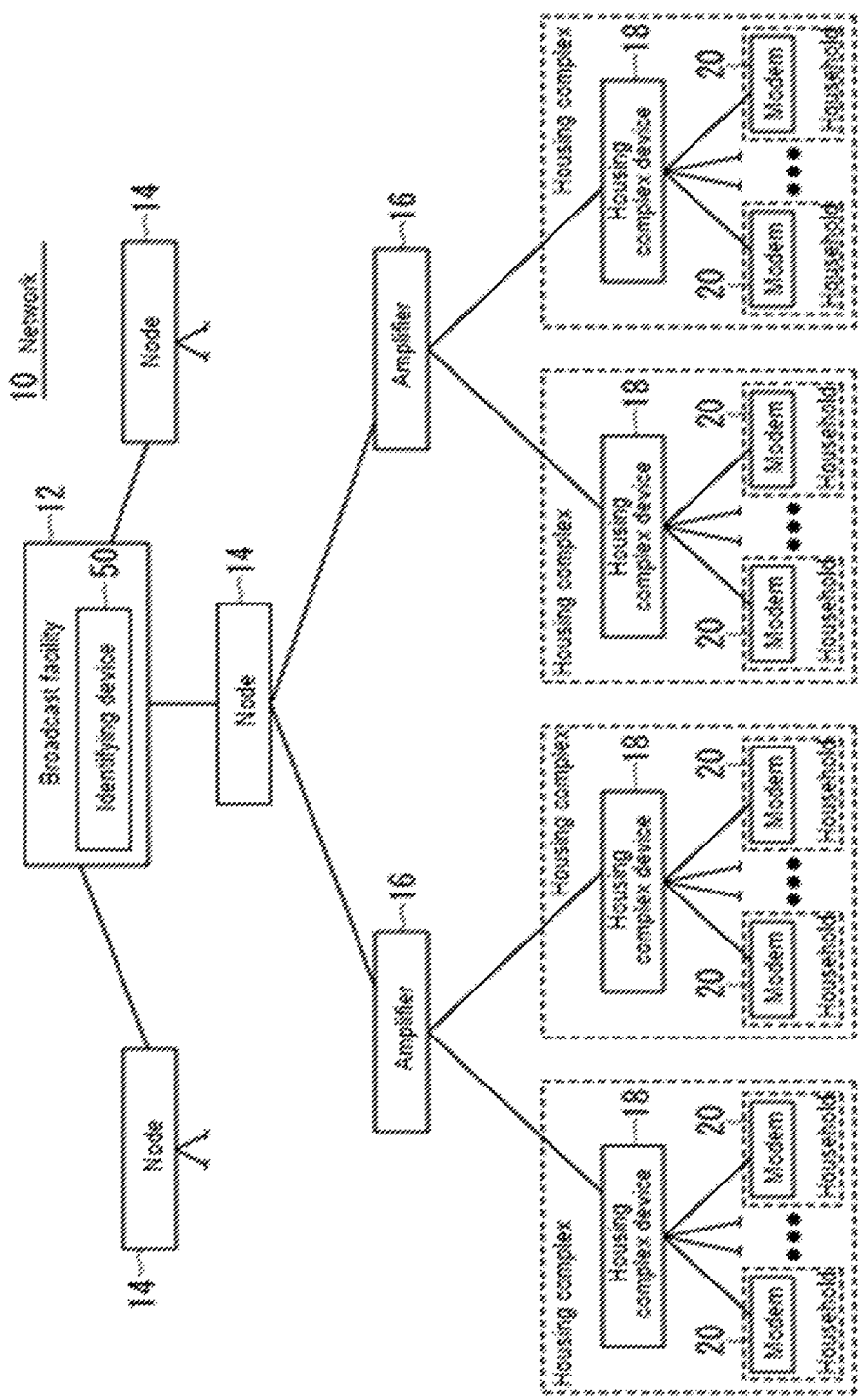
FIG. 1 is a general schematic diagram of a network.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following is an explanation of embodiments of the present invention with reference to particular embodiments. However, the disclosed embodiments do not limit the present invention in the scope of the claims. Also, all combinations of characteristics explained in the embodiments are not necessarily required in the technical solution of the present invention.

FIG. 1 is a general schematic diagram of a network 10. This network 10 has a tree-like structure in which nodes branch form route nodes at each level, and terminals are connected to each node. An example of a network 10 is a cable television broadcast network. As shown in FIG. 1, the network 10 includes a broadcast facility 12, nodes 14, amplifiers 16, housing complex devices 18, and modems 20. In the network 10, the broadcast facility 12 is at an upper level, and the modems 20 are at a lower level. Therefore, communication from the modems 20 to the broadcast facility 12 is upstream communication, and communication from the broadcast facility 12 to the modems 20 is downstream communication. The broadcast facility 12 is an example of an upper-level device. The nodes 14, the amplifiers 16 and the housing complex devices 18 are mid-level devices in the network 10, and are examples of mid-level devices connected to modems 20 and are examples of second devices. The modems 20 are examples of lower-level devices connected to the lower-level of the network 10 and are examples of first devices. The broadcast facility 12 is connected to the modems 20 via optic fibers or electrical lines. The nodes 14, the amplifiers 16, and the housing complex devices 18 serve as mid-level devices transmitting signals from the modems 20 to upper-level devices connected to the upper level.

The broadcast facility 12 is an example of a route node, and is located at the highest level of the network 10. The broadcast facility 12 can be located at a broadcast company which provides content such as television programming. The broadcast facility 12 transmits downstream signals such as picture signals containing content. The broadcast facility 12 also receives upstream signals from the modems 20 from nodes 14 via amplifiers 16 and housing complex devices 18. The broadcast facility 12 has an identifying device 50 which is able to identify the location of devices generating noise in the network 10.

A node 14 is connected to the broadcast facility 12 and a plurality of amplifiers 16. The nodes 14 are installed at the municipal level. The node 14 can convert optical signals transmitted by the broadcast facility 12 into electrical signals. The node 14 then transmits the converted communication signals to amplifiers 16. The node 14 also converts electrical signals transmitted by the modems 20 into optical signals. The node 14 then transmits the converted signals to the broadcast facility 12.

An amplifier 16 connects a node 14 to a plurality of housing complex devices 18. Amplifiers 16 may be located at many different levels in a communication path. An amplifier 16 amplifies communication signals received from a node 14, and transmits them to the housing complex devices 18. An amplifier 16 also amplifies signals received from the housing complex devices 18, and transmits them to a node 14.

A housing complex device 18 is connected to a node 14 and to a plurality of modems 20. A housing complex device 18 may be located in each building or on each floor of a housing complex such as a condominium. A housing complex device 18 includes a protector to protect the network 10 from abnormal occurrences such as lightning strikes, an amplifier for amplifying communication signals and transmitted signals, and a distributor for distributing the communication signals to each modem 20. A housing complex device 18 transmits communication signals received from an amplifier 16 to each modem 20. A housing complex device 18 also transmits signals received from a modem 20 to an amplifier 16. A housing complex device 18 may convert downstream optical signals into electrical signals or convert upstream electrical signals into optical signals.

A modem 20 is an example of a terminal node, and is located at the lowest level of the network 10. A modem 20 is connected to a housing complex device 18. A modem 20 may be located, for example, in each household of a housing complex. The modem 20 may be a set-top box (STB) connected to a television, a cable modem connected to a personal computer and a telephone to enable two-way data communication, a VoIP (Voice over Internet Protocol) with telephone function, or an Embedded Multimedia Terminal Adapter (E-MTA) integrated into a cable modem. When the modem 20 is an STB, the modem 20 converts communication signals received from a broadcast facility 12 via a housing complex device 18 into picture signals viewable on a television, and outputs the picture signals to the television. When the modem 20 is a cable modem, the modem 20 converts information entered using a personal computer into signals that are transmitted to a broadcast facility 12. The modem 20 transmits identification signals for identifying itself along with transmitted signals.

When there is a nearby source of noise, the modem 20 transmits noise from the source in addition to transmitted signals. Examples of noise sources include a loose connector in the communication path, a microwave oven, and an automatic door.

Figure 2:
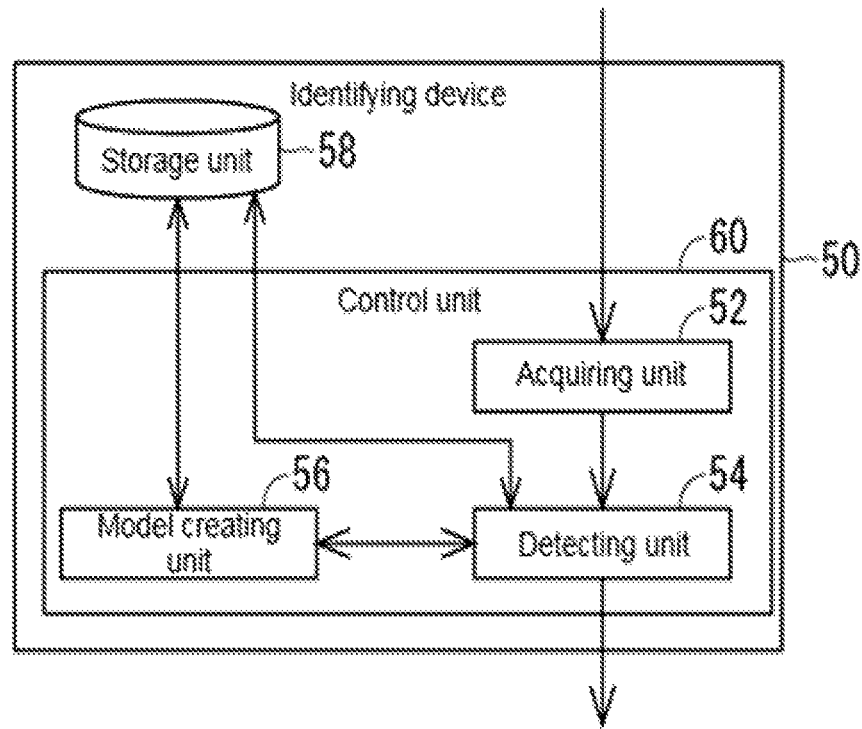
FIG. 2 is a configuration diagram of an identifying device.

FIG. 2 is a configuration diagram of an identifying device 50. The identifying device 50 identifies whether a node 14, an amplifier 16, a housing complex device 18 or a modem 20 is a source of noise generated in the network on the basis of amplitude fluctuations in signals transmitted from a modem 20. An example of an identifying device 50 is a computer such as a personal computer. As shown in FIG. 2, the identifying device 50 includes a control unit 60 and a storage unit 58. The control unit 60 is an arithmetic processing device such as a central processing unit (CPU). The control unit 60 functions as an acquiring unit 52, a detecting unit 54 and a model creating unit 56 by reading a program stored in the storage unit 58. A portion of the acquiring unit 52, detecting unit 54 and model creating unit 56 may be configured from hardware such as circuits.

The acquiring unit 52 is connected to the network 10 so as to be able to obtain information such as transmitted signals from optic fibers through which transmitted signals pass. The acquiring unit 52 obtains the amplitude fluctuation in the signals transmitted from modems 20 in the network 10 via housing complex devices 18, amplifiers 16 and nodes 14. For example, the acquiring unit 52 receives signals transmitted by a modem 20 from an optic fiber, and calculates the amplitude fluctuation from the amplitude values of the transmitted signals. The acquiring unit 52 also acquires identification signals from the modem 20 along with the transmitted signals. The acquiring unit 52 then associates the amplitude fluctuation with the modem 20 on the basis of the identification signals from the modem 20.

The detecting unit 54 is connected to the acquiring unit 52, the model creating unit 56 and the storage unit 58 in order to be able to input and output information. The detecting unit 54 acquires the amplitude fluctuation from the acquiring unit 52. The detecting unit 54 detects whether or not a modem 20, housing complex device 18, amplifier 16 or node 14 is transmitting signals containing noise on the basis of the amplitude fluctuation in the transmitted signals acquired by the acquiring unit 52. For example, the detecting unit 54 detects whether or not noise has occurred at a level lower than a housing complex device 18, an amplifier 16 or a node 14 on the basis of the amplitude fluctuations in the transmitting signals passing through housing complex devices 18, amplifiers 16 and nodes 14. In addition, the detecting unit 54 compares the past amplitude fluctuations of a modem 20 acquired from the storage unit 58 with the amplitude fluctuations at the time of detection acquired from the acquiring unit 52 to detect whether the modem 20 is generating noise. More specifically, the detecting unit 54 detects whether a modem 20 is generating noise using an amplitude fluctuation ratio that is the ratio of the amplitude fluctuations at the time of detection acquired from the acquiring unit 52 to past amplitude fluctuations acquired from the storage unit 58. The detecting unit 54 associates the amplitude fluctuation ratio calculated at the time of a noise generation model with the presence or absence of noise, and outputs the ratio to the model creating unit 56 or the storage unit 58. The detecting unit 54 also outputs the detected location of the noise to an external display device.

The model creating unit 56 is connected to the detecting unit 54 and the storage unit 58 so as to be able to input and output information. The model creating unit 56 creates a noise generation model in order to calculate the noise event probability, which is the probability that each modem 20 will generate noise. For example, when a noise generation model is created, the model creating unit 56 acquires, from the storage unit 58, the amplitude fluctuation ratio calculated by the detecting unit 54, and creates a noise generation model for a modem 20 using a logistic regression technique incorporating the amplitude fluctuation ratio. The model creating unit 56 then outputs the created noise generation model to the detecting unit 54 or the storage unit 58.

The storage unit 58 is connected to the detecting unit 54 and the model creating unit 56 so as to be able to input and output information. The storage unit 58 stores the programs and information needed to detect locations at which noise is being generated. For example, the storage unit 58 stores past amplitude fluctuations or the means of past amplitude fluctuations. Here, "past" can mean any time prior to the acquisition of amplitude fluctuations during noise-generating location detection or noise generation model creation for a modem 20 using a logistic regression technique.

Figure 3:
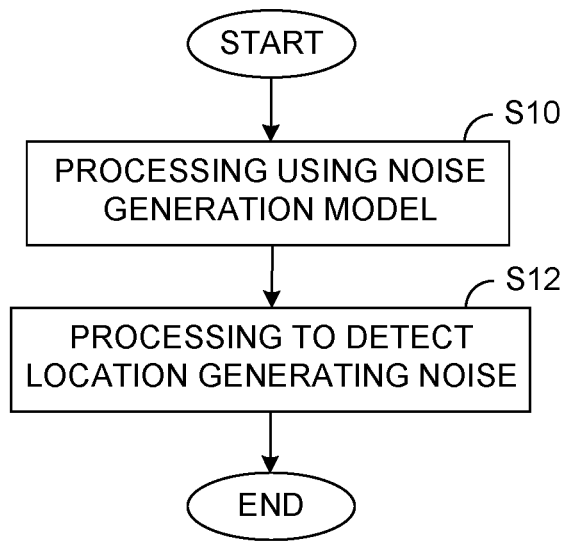
FIG. 3 is a flowchart of the main processing in an identifying method performed by the identifying device.

FIG. 3 is a flowchart of the main processing in the identifying method performed by the identifying device 50. In the main processing, the identifying device 50 first creates a noise generation model (S10) and then detects the location at which noise is being generated on the basis of the created noise generation model (S12).

Figure 4:
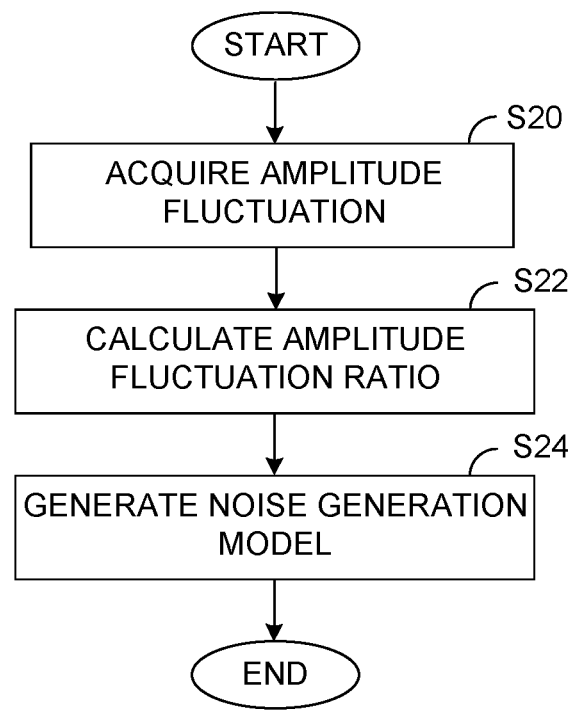
FIG. 4 is a flowchart of a noise generation model creating process.
Figure 5:
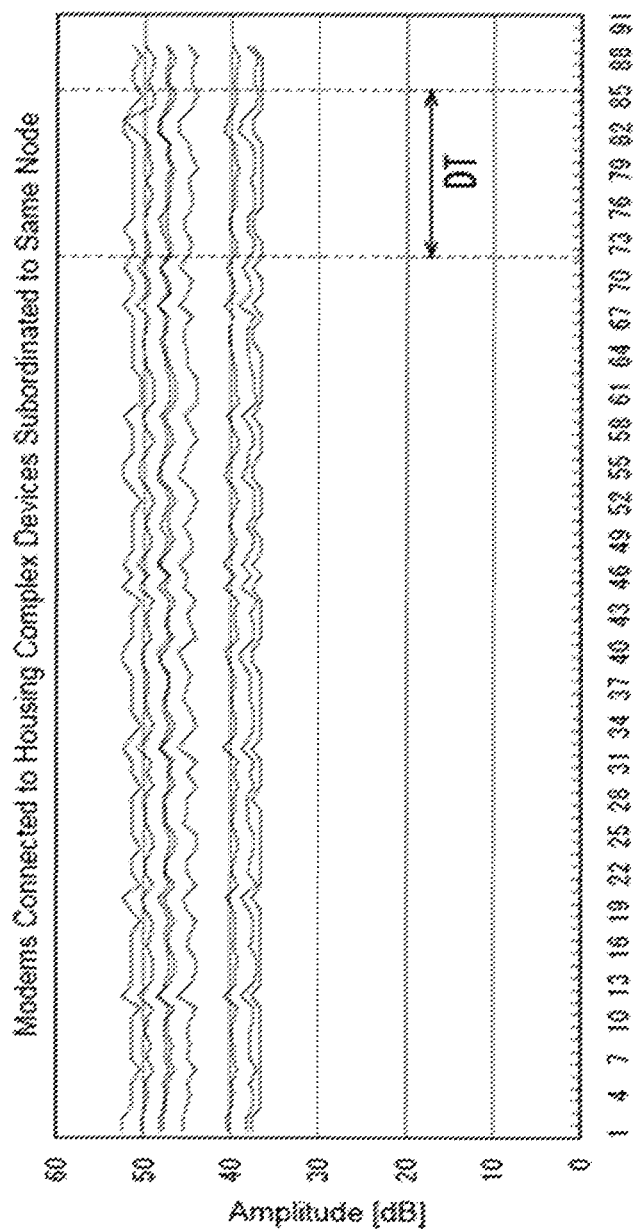
FIG. 5 is a waveform diagram of the amplitudes of the transmission signals acquired by the acquiring unit.
Figure 6:
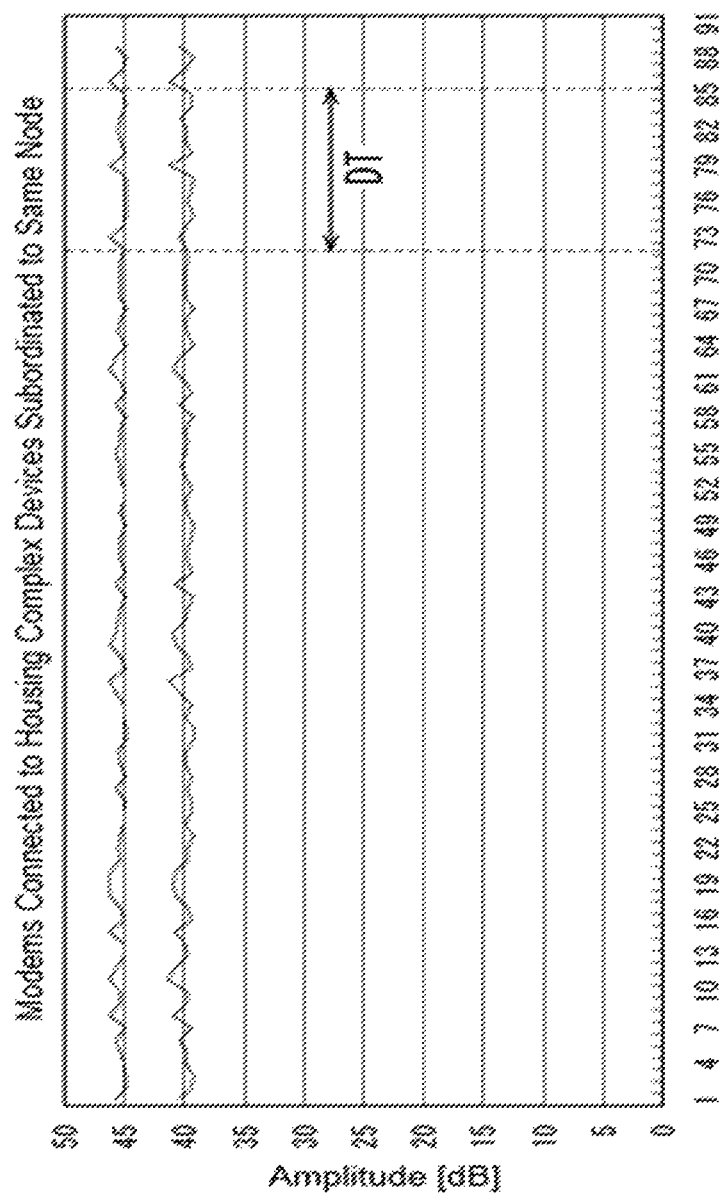
FIG. 6 is a waveform diagram of the amplitudes of the transmission signals acquired by the acquiring unit.
Figure 7:
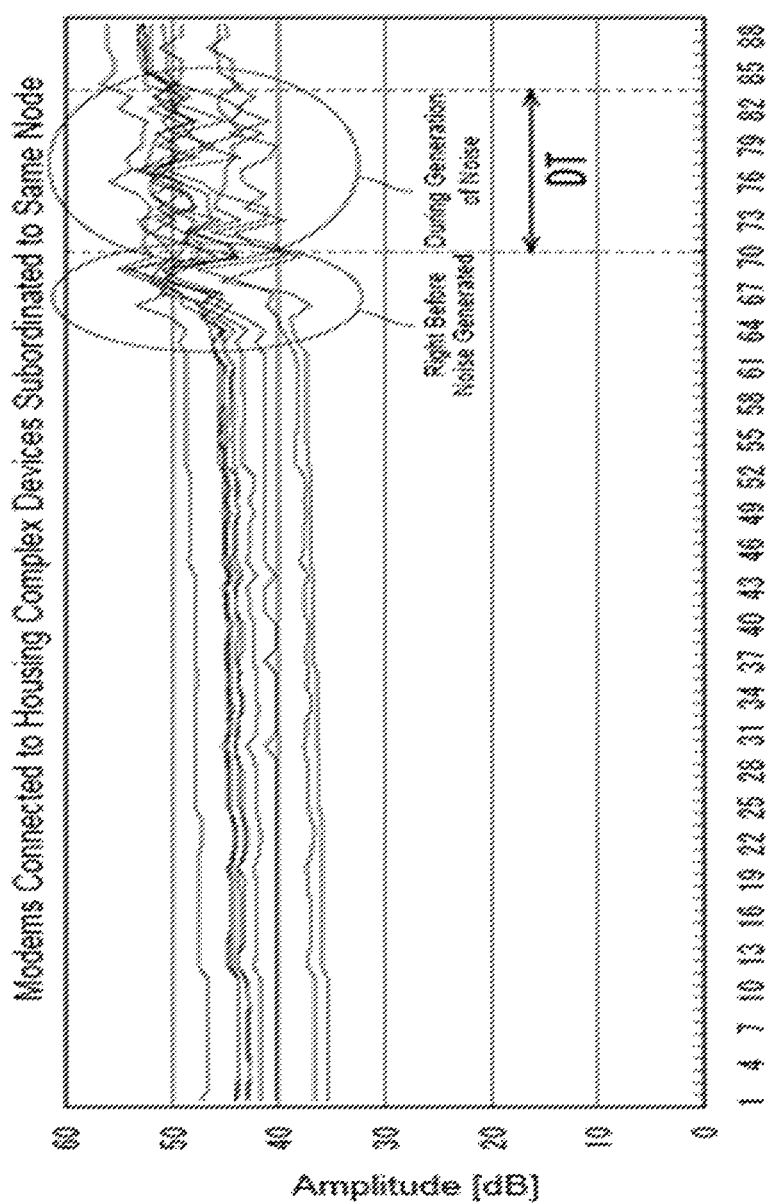
FIG. 7 is a waveform diagram of the amplitudes of the transmission signals acquired by the acquiring unit.
Figure 8:
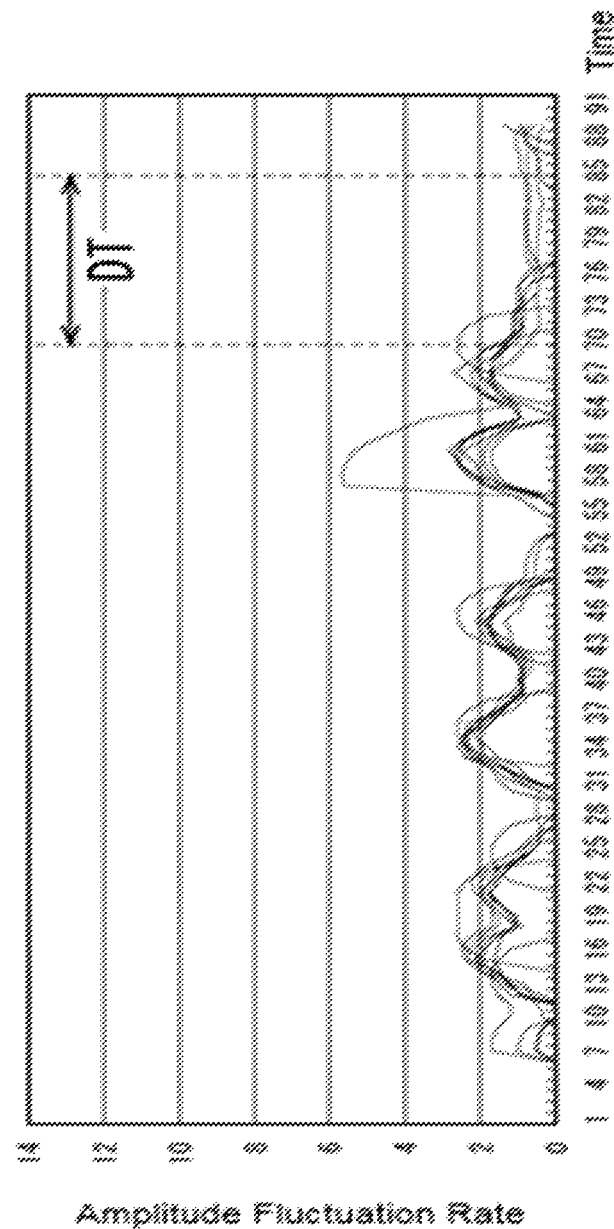
FIG. 8 is a waveform diagram of amplitude fluctuation rates (AR) calculated by a calculating unit arranged in a time series.
Figure 9:
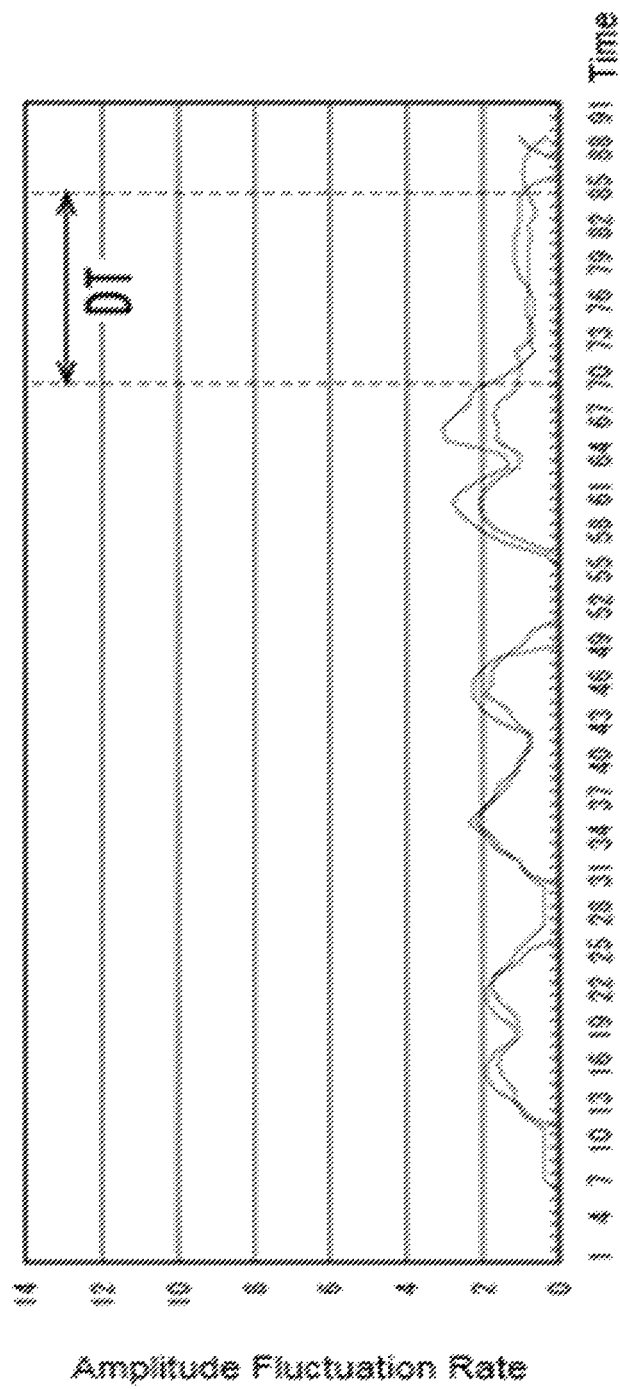
FIG. 9 is a waveform diagram of amplitude fluctuation rates (AR) calculated by the calculating unit arranged in a time series.
Figure 10:
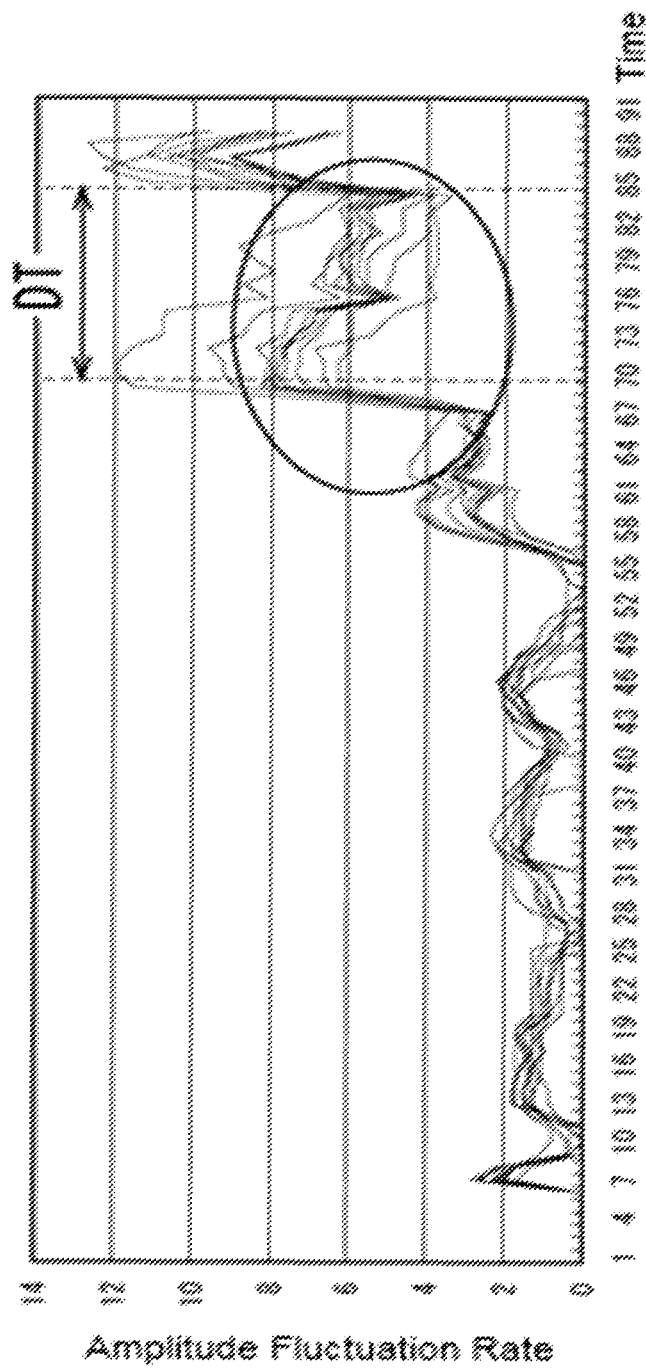
FIG. 10 is a waveform diagram of amplitude fluctuation rates (AR) calculated by the calculating unit arranged in a time series.

FIG. 4 is a flowchart of the noise generation model creating process in Step S10. FIG. 5, FIG. 6, and FIG. 7 are waveform diagrams of transmission signal amplitudes acquired by the acquiring unit 52. FIG. 8, FIG. 9 and FIG. 10 are waveform diagrams in which amplitude fluctuation ratios AR calculated by the detecting unit 54 have been arranged in time series. The process for creating a noise generation model is executed prior to the process for detecting the location at which noise is being generated.

In the process for creating a noise generation model, as shown in FIG. 4, the acquiring unit 52 first acquires the amplitude fluctuations of each modem 20 (S20). For example, the acquiring unit 52 acquires the amplitudes of signals transmitted by each modem 20 along with the identification information for each modem 20. The amplitudes of the transmitted signals acquired by the acquiring unit 52 are the waveforms shown from FIG. 5 to FIG. 7. In FIG. 5 through FIG. 7, the horizontal axis represents the time, and the vertical axis represents the amplitude of the transmitted signals at the voltage level used by each modem 20 to transmit signals (unit: dB). DT represents the detection time during which the amplitudes are detected in order to create a noise generation model.

FIG. 5 is a waveform diagram of the amplitudes of the signals transmitted by the modems 20 connected to a single housing complex device 18. FIG. 6 and FIG. 7 are also waveform diagrams of the amplitudes of the signals transmitted by the modems 20 connected to a single housing complex device 18. In FIG. 5 and FIG. 6, the waveforms do not include those of the modem 20 generating noise. In FIG. 7, the waveforms include those of a modem 20 which generated noise during the detection time DT. After the detection time DT in FIG. 7, the occurrence of noise is detected and the waveform is repaired by service personnel. Here, the waveform before and after the detection time DT indicated by the oval in FIG. 7 clearly fluctuates much more wildly than the waveforms detected during the detection time DT shown in FIG. 5 and FIG. 6.

The waveforms shown in FIG. 5 through FIG. 7 are the waveforms of the amplitudes of modems 20 connected to different housing complex devices 18 but the same node 14. When noise is generated by a modem 20, the noise is known to ingress with the signals transmitted by nearby modems 20. (This is known as ingress noise.) The ingress of noise is known to be higher in modems 20 near a modem 20 generating the noise 20. Therefore, as shown in FIG. 7, when a modem 20 generates noise, the signals transmitted from nearby modems 20 also include noise.

The acquiring unit 52 calculates the amplitude fluctuation σb from the amplitude of the transmitted signals that have been acquired. An example of an amplitude fluctuation is the standard deviation of the amplitude. The acquiring unit 52 calculates the amplitude fluctuation σb on the basis of Equation (1) shown below. The number of amplitude samples N is the number of samples during the detection time DT.

Equation 1

$$\sigma b^2 = \frac{1}{N}\sum_{i=1}^{N}(Xi - m)^2 \qquad (1)$$

N: Number of amplitude samples
Xi: Amplitude value (dB)
m: Arithmetic mean of N amplitudes The acquiring unit 52 calculates the amplitude arithmetic mean m using Equation (2) below.

Equation 2

$$m = \frac{1}{N}\sum_{i=1}^{N} Xi \qquad (2)$$

Here, the detection time DT is eight hours, and the number of fluctuation samples N is 480. In this case, the acquiring unit 52 samples amplitude value Xi every minute during the detection time DT for a total of 480 samples on the basis of the amplitude waveform. The acquiring unit 52 substitutes the 480 sampled amplitude values Xi in Equation (2) to calculate the arithmetic mean m of the amplitude. Next, the acquiring unit 52 substitutes the calculated arithmetic mean m and the 480 amplitude values Xi in Equation (1) to calculate the amplitude fluctuation σb. The acquiring unit 52 obtains amplitude fluctuations σb during the creation of a noise generation model in this way. The acquiring unit 52 may acquire the amplitude fluctuations σb directly from the broadcasting facility 12 instead of calculating it from the amplitude values Xi. The acquiring unit 52 outputs the acquired amplitude fluctuations σb to the detecting device 54 along with the identification signals of the modem 20.

Here, the acquiring unit 52 may calculate the amplitude fluctuations σb several times on the basis of amplitude values acquired using the sliding window technique. For example, when the detection time DT is eight hours, the acquiring unit 52 samples the amplitude values Xi from amplitudes acquired from 0:00 to 8:00, and calculates a first amplitude fluctuation σb. Next, the acquiring unit 52 samples amplitude values Xi from amplitudes acquired from 1:00 to 9:00, and calculates a second amplitude fluctuation σb. In this way, the acquiring unit 52 calculates each amplitude fluctuation σa during a pth and a p+1th detection time which overlap for seven hours. In this way, the acquiring unit 52 can calculate multiple amplitude fluctuations σb on the basis of amplitudes in a short period of time.

The detecting unit 54 calculates the amplitude fluctuation ratio AR of each modem 20 (S22). The amplitude fluctuation ratio AR is the ratio of the amplitude fluctuation σb during creation of a noise generation model to a past amplitude fluctuation σa. Here, "past amplitude fluctuation" includes both past amplitude fluctuations and the mean of past amplitude fluctuations. When calculating an amplitude fluctuation ratio AR, the detecting unit 54 acquires a past amplitude fluctuation σa stored in the storage unit 58.

The method used to calculate the past amplitude fluctuations σa stored in the storage unit 58 is the same method used to calculate the amplitude fluctuations σb during the creation of a noise generation model described above. Therefore, the acquiring unit 52 calculates and acquires past amplitude fluctuations σa on the basis of the amplitude fluctuation σb calculating and acquiring method described above, and stores them in the storage unit 58. However, the acquiring unit 52 may use a detection time DT for creating the noise generation model that differs from the detection time DT used to calculate the past amplitude fluctuation σa. The acquiring unit 52 may also use a number of samples to create the noise generation model that differs from the number of samples used to calculate the past amplitude fluctuations σa.

When a mean of past amplitude fluctuations σa is used as the past amplitude fluctuations σa, the acquiring unit 52 may calculate multiple past amplitude fluctuations σa, and use the arithmetic means of the past amplitude fluctuations σa as the past amplitude fluctuations σa. Here, the acquiring unit 52 may calculate the multiple past amplitude fluctuations σa using amplitude values obtained using the sliding door technique described above. The acquiring unit 52 calculates past amplitude fluctuations σa P times, and calculates, as the past amplitude fluctuations σa, the arithmetic means, which is the sum of the P past amplitude fluctuations σa divided by P.

The detecting unit 54 calculates the amplitude fluctuation ratio AR on the basis of Equation (3) below from the past amplitude fluctuations σa and the amplitude fluctuations σb used to create the model. When the amplitude fluctuation ratios AR calculated by the detecting unit 54 are arranged in a time series, the waveforms can be those shown, for example, in FIG. 8 through FIG. 10. In FIG. 8 through FIG. 10, the horizontal axis represents the time, and the vertical axis represents the amplitude fluctuation ratios AR of each modem 20. The waveforms of the amplitude fluctuation ratios AR shown in FIG. 8 through FIG. 10 correspond, respectively, to the waveforms for the amplitudes shown in FIG. 5 through FIG. 7.

Equation 3

$$AR = \sigma_b / \sigma_a \quad (3)$$

The detecting unit 54 may calculate the amplitude fluctuation ratio AR several times for each modem 20. The detecting unit 54 also calculates at least one amplitude fluctuation ratio AR on the basis of the amplitude fluctuation σb when noise is being generated. The detecting unit 54 associates the calculated amplitude fluctuation ratios AR with the presence or absence of noise when the amplitude fluctuations σb were sampled, and outputs the association to the model creating unit 56 or the storage unit 58.

The model creating unit 56 creates a noise generation model for a modem 20 on the basis of the acquired amplitude fluctuation ratio AR (S24). For example, the model creating unit 56 creates a noise generating modem for a modem 20 in a logistic regression technique using the presence or absence of noise generated by the modem 20 as the objective variable and the amplitude fluctuation ratio AR when the noise generation model is generated for the modem 20 as the description function. The objective variable is "1" when noise is generated during the sampling of an amplitude fluctuation σb while a noise generation model is being created, and is "0" when noise is not generated. The value of the objective variable is associated with the modem and with the amplitude fluctuation ratio AR on the basis of the past history, and stored in the storage unit 58. More specifically, the model creating unit 56 creates a noise generation model able to calculate the noise generation probability p of the modem 20 on the basis of Equation (4) below using a logistic regression technique. In Equation (4), β0 and β1 are constants. The model creating unit 56 calculates β0 and β1 using a known solution to the logistic regression technique such as the maximum-likelihood method. The model creating unit 56 outputs the created noise generation model to the detecting unit 54. The model creating unit 56 creates one noise generation model shown in Equation (4) for all modems 20.

Equation 4

$$p = \frac{1}{1 + e^{-(\beta 0 + \beta 1 * AR)}} \quad (4)$$

p: Probability of noise generation in modem
AR: Amplitude fluctuation rate

Figure 11:
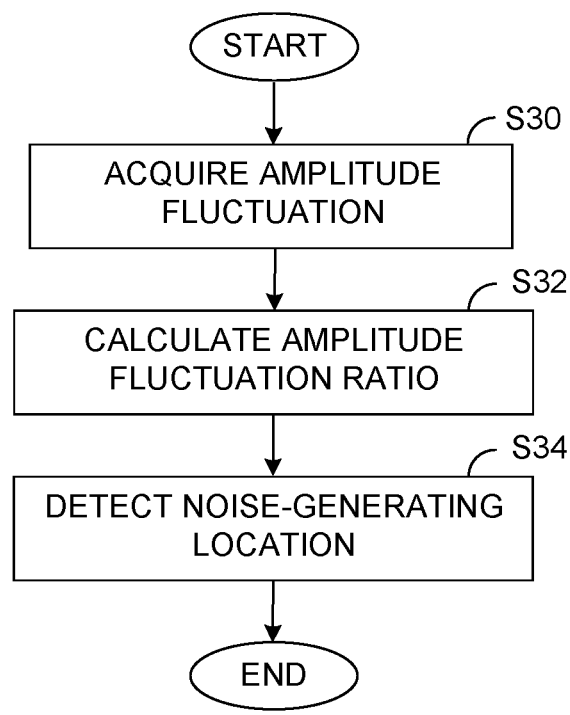
FIG. 11 is a flowchart of a process for detecting the noise generating location.

FIG. 11 is a flowchart of the process for detecting the noise generating location in Step S12. The identifying device 50 executes the process for detecting the location at which noise is being generated when noise occurs.

In the process performed to detect the location at which noise is being generated, as shown in FIG. 11, the acquiring unit 52 first calculates the amplitude fluctuations of each modem 20 during the detection time DT, which includes the time at which noise is generated (S30). Here, the acquiring unit 52 may calculate the amplitude fluctuations σb using the same method as in Step S20. The acquiring unit 52 may set a detection time DT in Step S30 that differs from the detection time DT in Step S20. For example, the acquiring unit 52 may align the detection time DT in Step S30 with the time at which noise is generated. The acquiring unit 52 outputs the amplitude fluctuations σb of each modem 20 acquired during the process performed to detect the location at which noise is being generated to the detecting unit 54 along with the identification signals of the modems 20.

Next, the detecting unit 54 calculates, as the amplitude fluctuation ratio AR during the detection time, the ratio of the amplitude fluctuations σb of each modem 20 acquired by the acquiring unit 52 during the detection time to the past amplitude fluctuations σa of each modem 20 stored in the storage unit 58 (S32).

Next, the detecting unit 54 detects the location at which the noise is being generated on the basis of the noise generation model and the amplitude fluctuation ratio AR, and outputs the detected location at which noise is being generated to a display device (S34). For example, the detecting unit 54 substitutes the amplitude fluctuation ratio AR in the noise generation model shown in Equation (4) created by the model creating unit 56, and calculates the noise generating probability p of each modem 20. The detecting unit 54 detects the location at which noise is being generated on the basis of the noise generating probability p.

For example, the detecting unit 54 detects the modem 20 with the highest noise generating probability p as the location at which noise is being generated. The detecting unit 54 may also detect one or more modems 20 with a noise generating probability p exceeding a threshold value as locations at which noise is being generated. The detecting unit 54 may also detect the location at which noise is being generated on the basis of the difference between the noise generating probability p of one modem 20 and the noise generating probability p of other modems 20 with a high noise generating probability p. In this case, the detecting unit 54 may detect all modems 20 with a noise generating probability p greater than the noise generating probability p of a modem 20 serving as the threshold value for the difference as locations at which noise is being generated because the difference exceeds a threshold value.

When performing another detection of the location at which noise is being generated, the detecting unit 54 may detect, as the location at which noise is being generated, a mid-level device such as a node 14, an amplifier 16 or a housing complex device 18. Here, locations at which noise is being generated may include noise generated by the mid-level device itself or noise generated by a modem 20 connected to the mid-level device downstream. In this case, the detecting unit 54 detects a first non-event probability 1-pi, which is the probability that a modem 20 is not generating noise, for each of the modems 20 on the basis of the amplitude fluctuations. Here, pi is the noise-generating probability 20 of each modem 20 connected to the mid-level device which was calculated by the detecting unit 54 on the basis of Equation (4). The detecting unit 54 calculates the noise generating probability pΠ, which is the probability that signals transmitted by the mid-level device contain noise, on the basis of a value obtained by multiplying the first non-event probability 1-pi of all modems 20 connected to each of a plurality of mid-level devices on the basis of Equation (5) below. The detecting unit 54 calculates the noise generating probability pΠ of each mid-level device belonging to the same level. The noise generating probability pΠ is an example of a second event probability. The detecting unit 54 detects, as the mid-level device connected to the noise-generating modem 20, the mid-level device with the highest noise generating probability pΠ among all of the mid-level devices belonging to the same level.

Equation 5

$$p\Pi = 1 - \prod_{i=1}^{M}(1 - p_i) \qquad (5)$$
$$= 1 - (1 - p_1)(1 - p_2) \ldots (1 - p_M)$$

pΠ: Probability of noise generation by mid-level device
M: Number of modems connected to mid-level device For example, when a housing complex device 18 is to be detected as a mid-level device at which noise is being generated, the noise generating probability p of each modem 20 connected to each housing complex device 18 is substituted in Equation (5) to calculate the noise generating probability pΠ of the housing complex devices 18. The detecting unit 54 detects, as the location at which noise is being generated, the housing complex device 18 with the highest calculated noise generating probability pΠ. This includes situations in which the noise is being generated by the housing complex device 18 itself and situations in which noise is being generated by one or more of the modems 20 connected to the housing complex device 18.

When performing yet another detection of the location at which noise is being generated, the detecting unit 54 may combine the two detection methods described above. For example, when the noise generating probability p of a modem 20 exceeds a threshold value, the detecting unit 54 detects more than one modem 20 as the location at which noise is being generated on the basis of the noise generating probabilities p. When the highest noise generating probability p does not exceed the threshold value as described above, the detecting unit 54 calculates the noise generating probabilities pΠ of the mid-level devices to detect whether any of the mid-level devices is the location at which noise is being generated.

As mentioned above, the identifying device 50 acquires amplitude fluctuations σb from the amplitudes of transmission signals that can be easily acquired by the acquiring unit 52, and the detecting unit 54 detects the location at which noise is being generated on the basis of the amplitude fluctuations σb. In this way, the identifying device 50 can detect a location at which noise is being generated using a simple configuration and process. More specifically, the detecting unit 54 can detect a location at which noise is being generated more easily and more precisely using the amplitude fluctuation ratio AR of the amplitude fluctuation σb at the time of detection to a past amplitude fluctuation σa.

In the identifying device 50, the detecting unit 54 can detect the noise generating probability p of each modem 20 using a noise generation model created by a model creating unit 56 using a logistic regression technique. In this way, the detecting unit 54 can improve the probability of detecting the location at which noise is being generated down to the smallest unit, that is, down to the level of a modem.

The identifying device 50 can calculate the noise generating probability pΠ of mid-level devices (such as housing complex devices 18) on the basis of the noise generating probabilities p calculated by the detecting unit 54. By detecting a mid-level device as the noise-generating device when the difference in noise generating probabilities p between modems 20, the detecting unit 54 can quickly and easily isolate the location at which noise is being generated. Even when noise is generated temporarily, the identifying device 50 can improve the probability of detecting the location at which noise is being generated.

When the identifying device 50 is calculating amplitude fluctuation ratios AR, the detecting unit 54 can use the means of several past amplitude fluctuations σa as the past amplitude fluctuation. In this case, the detecting unit 54 can calculate amplitude fluctuation ratios AR using more appropriate past amplitude fluctuations σa in which the effect of noise has been reduced, even when past amplitude fluctuations σa during the generation of noise are included.

The connection relationships, the values such as the number of connections, and the functions can be changed in the configuration of the embodiment described above if necessary.

In the embodiment described above, it was assumed that signals transmitted by the modems 20 could be received. However, if the power is off and transmitted signals cannot be received from a modem 20, a noise generation model may be created and the location at which noise is being generated may be detected on the basis of an amplitude fluctuation calculated from past amplitudes received from the modem 20 or from the mean of these amplitude fluctuations.

In the embodiment described above, a single noise generation model was generated for a single network 10. However, noise generation models may be generated for each node 14, amplifier 16, housing complex device 18, and modem 20.

In the embodiment described above, it was assumed that the modems 20 were connected to terminals in the network 10. However, the embodiment described above may also be applied to detect whether or not noise is being generated by a terminal that is not connected to a modem 20. Here, the terminal is simply treated as a first device.

In the embodiment described above, the model creating unit 56 creates a noise generation model using a logistic regression technique. However, the noise generation model may also be created using some other method.

In the embodiment described above, the identifying device 50 was installed in a broadcast facility 12. However, an identifying device 50 may be provided for each node 14, amplifier 16, and housing complex device 18. For example, when an identifying device 50 described above is provided for each node 14, the nodes 14 serve as examples of upper-level devices.

Figure 12:
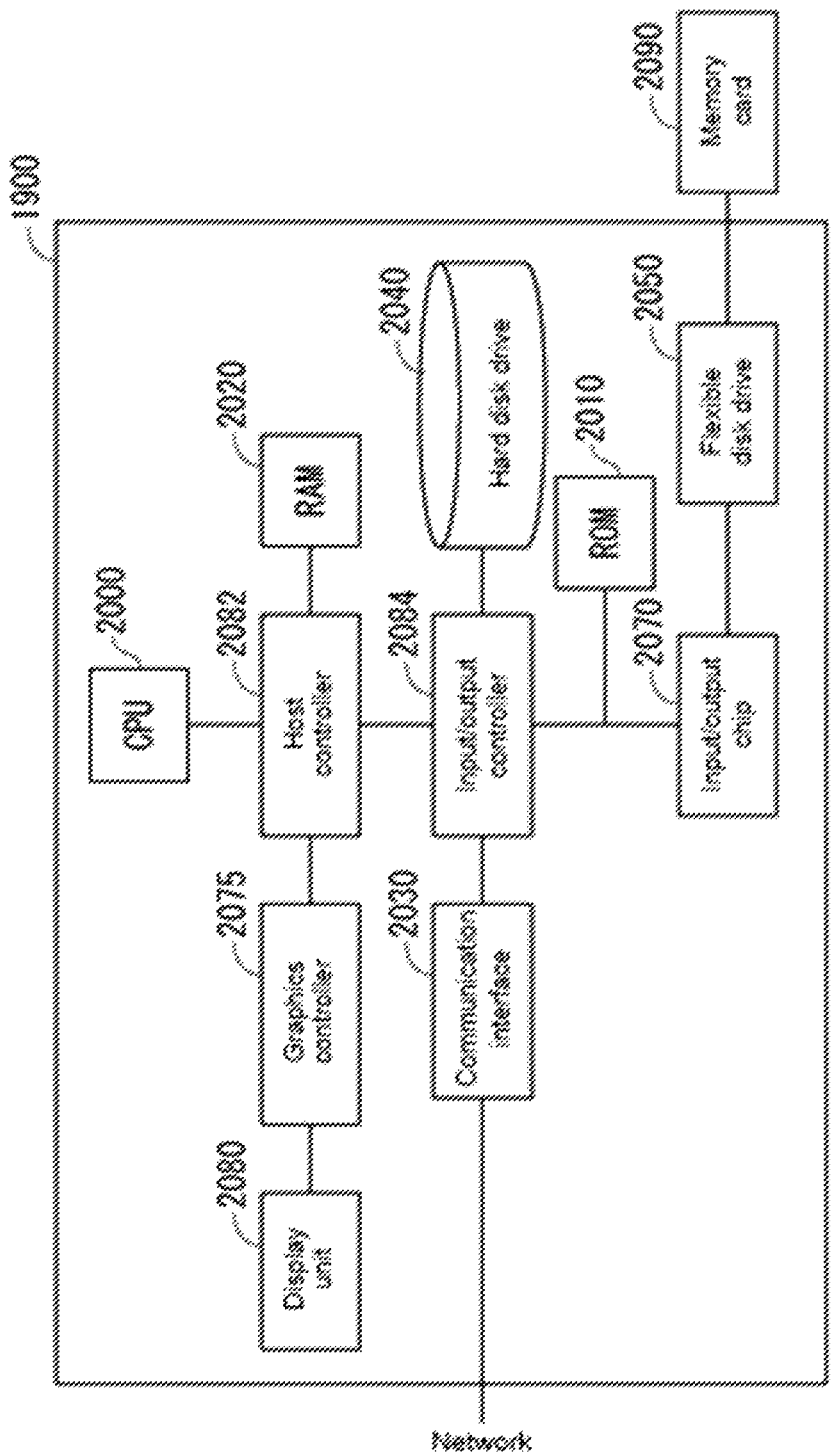
FIG. 12 shows an example of a hardware configuration for the computer in various embodiments.

FIG. 12 shows an example of a hardware configuration for a computer 1900 in the present embodiment. The computer 1900 is an example of an identifying device 50. The computer 1900 is equipped with a CPU peripheral portion having a CPU 2000, RAM 2020, graphics controller 2075 and display device 2080 connected to each other by a host controller 2082, an input/output portion having a communication interface 2030 and a hard disk drive 2040 connected to the host controller 2082 by an input/output controller 2084, and a legacy input/output portion having a ROM 2010, flexible disk drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various units. The graphics controller 2075 acquires the image data generated in the frame buffer of the RAM 2020 by the CPU 2000 and other units, and displays this image data on the display device 2080. Alternatively, the graphics controller 2075 can include a frame buffer for storing image data generated by the CPU 2000 and other units.

The input/output controller 2084 is connected to a host controller 2082, a communication interface 2030 serving as a relatively high-speed input/output device, and a hard disk drive 2040. The communication interface 2030 communicates with the other devices via a network. The hard disk drive 2040 stores programs, such as the display program used by the CPU 2000 in the computer 1900, and data.

The input/output controller 2084 is connected to the ROM 2010, a memory drive 2050, and the relatively low-speed input/output device of the input/output chip 2070. The ROM 2010 stores the boot program executed by the computer 1900 at startup and/or programs relying on hardware in the computer 1900. The flexible disk drive 2050 reads programs or data from a memory card 2090, and provides the programs and data to the hard disk drive 2040 via the RAM 2020. The input/output chip 2070 connects the flexible disk drive 2050 to the input/output controller 2084, and various types of input/output devices are connected to the input/output controller 2084 via a parallel port, serial port, keyboard port, or mouse port, etc.

A program provided to the hard disk drive 2040 via the RAM 2020 is stored on a recording medium such as a memory card 2090 or IC card provided by the user. A program is read from the recording medium, installed in the hard disk drive 2040 inside the computer 1900 via the RAM 2020, and executed by the CPU 2000.

Programs causing the computer 1900 to function as the identifying device 50 include an acquiring module, detection module, and generating module. These programs or modules may work with the CPU 2000 and other components to cause the computer 1900 to function as the acquiring module, detection module, and generating module.

The information processing steps written in these programs are specific means activated by reading the programs to the computer 1900 so that the software cooperates with the various types of hardware resources described above. These specific means function as the acquiring module, detection module and generating module. These specific means realize operations and the processing of information in the computer 1900 of the present embodiment to construct an identifying device 50 for this intended purpose.

For example, when the computer 1900 communicates with an external device, the CPU 2000 executes the communication program loaded in the RAM 2020, and instructs the communication interface 2030 in the communication processing on the basis of the processing content described in the communication program. The communication interface 2030 is controlled by the CPU 2000, and reads the transmitted data stored in the transmission buffer region of a memory device such as the RAM 2020, hard disk drive 2040 or memory card 2090, or writes reception data received from the network to a reception buffer region of the storage device. In this way, the communication interface 2030 transfers transmitted and received data to a storage device using the direct memory access (DMA) method. Alternatively, the CPU 2000 transfers transmitted and received data by reading data from the source storage device or communication interface 2030, and transfers and writes data to the destination communication interface 2030 or storage device.

Also, the CPU 2000 writes all of the data or the necessary data to the RAM 2020 via, for example, a DMA transfer, from files or databases stored in an external storage device such as a hard disk drive 2040 or a memory drive 2050 (memory card 2090), and performs various types of processing on the data in the RAM 2020. The CPU 2000 then writes the processed data to an external storage device via, for example, a DMA transfer. Because the RAM 2020 temporarily stores the contents of the external storage device during this process, the RAM 2020 and the external storage device are generally referred to in the present embodiment as memory, a storage unit, or a storage device. The various types of information in the programs, data, tables and databases of the present embodiment are stored in these memory devices, and are the targets of information processing. The CPU 2000 can hold some of the RAM 2020 in cache memory, and read and write data to the cache memory. Even here the cache memory performs some of the functions of the RAM 2020. Therefore, this division is excluded in the present embodiment. Cache memory is included in the RAM 2020, the memory, and/or the storage device.

The CPU 2000 also performs various types of processing on data read from the RAM 2020 including the operations, processing, condition determination, and information retrieval and substitution described in the present embodiment and indicated by a sequence of instructions in the program, and writes the results to the RAM 2020. For example, when performing a condition determination, the CPU 2000 compares various types of variables described in the present embodiment to other variables or constants to determine whether or not conditions such as greater than, less than, equal to or greater than, equal to or less than or equal to have been satisfied. When a condition has been satisfied (or not satisfied), the process branches to a different sequence of instructions or calls up a subroutine.

A program or module described above can be stored in a recording medium of an external unit. Instead of a memory card 2090, the recording medium can be an optical recording medium such as a DVD or CD, a magneto-optical recording medium such as MO, a tape medium, or a semiconductor memory such as an IC card. The recording medium can also be a storage device such as a hard disk or RAM provided in a server system connected to a dedicated communication network or the internet, and the program can be provided to the computer 1900 via the network.

The present invention was explained using an embodiment, but the technical scope of the present invention is not limited to the embodiment described above. The possibility of many changes and improvements to this embodiment should be apparent to those skilled in the art. Embodiments including these changes and improvements are within the technical scope of the present invention, as should be clear from the description of the claims.

The order of execution for operations, steps and processes in the devices, systems, programs and methods described in the claims, description and drawings were described using such terms as "previous" and "prior". However, these operations, steps and processes can be realized in any order as long as the output of the previous process is used by the subsequent process. The operational flow in the claims, description and drawings were explained using terms such as "first" and "next" for the sake of convenience. However, the operational flow does not necessarily have to be executed in this order.

REFERENCE SIGNS LIST

10: Network
12: Broadcast facility
14: Node
16: Amplifier
18: Housing complex device
20: Modem
50: Identifying device
52: Acquiring unit
54: Detecting unit
56: Generating unit
58: Storage unit
60: Control unit
1900: Computer
2000: CPU
2010: ROM
2020: RAM
2030: Communication interface
2040: Hard disk drive
2050: Memory drive
2070: Input/output chip
2075: Graphics controller
2080: Display device
2082: Host controller
2084: Input/output controller
2090: Memory card The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for identifying a location of noise in a network, the method comprising:
   acquiring, by an identifying device having a central processing unit, amplitude fluctuations in signals transmitted from first devices via at least one second device to an upper-level device in a network, by the identifying device, the network being a tree-like structure having the upper-level device at a highest level of the network, one or more second devices at one or more middle levels of the network, the one or more second devices including two or more second devices at a same middle level, and a plurality of first devices at a lowest level of the network; and
   detecting, by the identifying device, a noise-generating device that is transmitting signals containing noise on the basis of the acquired amplitude fluctuations in signals, wherein the detecting of the noise-generating device further comprises:
      detecting whether the noise-generating device is downstream from a particular one of the second devices;
      determining a non-event probability for each of the first devices, the non-event probability being a probability of an absence of noise being generated by a first device,
      determining an event probability for each of the second devices at a same level, the event probability being a probability of noise being included in signals transmitted from a second device, wherein an event probability for a particular second device is determined as a product of non-event probabilities of all of the first devices connected to the particular second device, and
      detecting a particular second device of two or more second devices at a same level as a noise-generating device when the particular second device has a highest event probability of the two or more second devices at the same level.

2. The method of claim 1, further comprising acquiring, by the identifying device, an identification signal from the first devices along with the signals transmitted from the first devices and associating an amplitude fluctuation with respective first devices on the basis of the identification signals from the first devices.

3. The method of claim 1, wherein the identifying device includes a storage device to store first amplitude fluctuations of the first devices acquired at a first time, wherein:
   the detecting, by the identifying device, of a noise-generating device includes detecting a particular first device as the noise-generating device by comparing a first amplitude fluctuation of the particular first device to an amplitude fluctuation of the particular first device acquired at a time of detection, the first time preceding the time of detection.

4. The method of claim 3, wherein the detecting, by the identifying device, of a noise-generating device includes detecting the particular first device as the noise-generating device using an amplitude fluctuation ratio of the amplitude fluctuation of the particular first device at the time of detection to the first amplitude fluctuation at the first time of the particular first device.

5. The method of claim 4, further comprising generating a noise generation model by the identifying device, wherein:
   the detecting of a noise-generating device includes detecting a first device as the noise-generating device using the noise generation model, and
   the noise generation model is generated using logistic regression, wherein a presence or absence of noise in a particular first device is an objective variable and the ratio of the amplitude fluctuation of the particular first device at the time of detection to the first amplitude fluctuation of the particular first device in the particular first device is a description function.

6. The method of claim 4, wherein the detecting, by the identifying device, of a noise-generating device uses a mean of a plurality of first amplitude fluctuations of the particular first device as the first amplitude fluctuation of the particular first device in the ratio of the amplitude fluctuation of the particular first device at the time of detection to the first amplitude fluctuation of the particular first device.

\* \* \* \* \*